United States Patent
Le et al.

(10) Patent No.: US 8,534,919 B2
(45) Date of Patent: Sep. 17, 2013

(54) APPARATUS FOR FLUID RECIRCULATION

(75) Inventors: Lynn Bich-Quy Le, San Jose, CA (US); Alan Lyndon Grantz, Aptos, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/621,212

(22) Filed: Sep. 15, 2012

(65) Prior Publication Data

US 2013/0064485 A1 Mar. 14, 2013

Related U.S. Application Data (60) Continuation of application No. 13/194,796, filed on Jul. 29, 2011, which is a continuation of application No. 12/176,360, filed on Jul. 19, 2008, now abandoned, which is a division of application No. 10/632,449, filed on Jul. 31, 2003, now Pat. No. 7,407,327.

(60) Provisional application No. 60/456,896, filed on Mar. 21, 2003.

(51) Int. Cl.
*F16C 32/06* (2006.01)
*F16C 33/74* (2006.01)

(52) U.S. Cl.
USPC .......................................................... 384/107

(58) Field of Classification Search
USPC ................ 384/107, 111, 112, 113, 114, 115, 384/118, 119, 120, 132; 310/90; 360/99.08, 360/98.07
See application file for complete search history.

(56) References Cited

U.S. PATENT DOCUMENTS

| | | | | |
|---|---|---|---|---|
| 5,533,811 | A * | 7/1996 | Polch et al. | 384/107 |
| 5,647,672 | A * | 7/1997 | Fukutani | 384/100 |
| 6,364,532 | B1 * | 4/2002 | Yoshikawa et al. | 384/107 |
| 2001/0022869 | A1 * | 9/2001 | Tanaka et al. | 384/100 |

* cited by examiner

*Primary Examiner* — Justin Krause (57) ABSTRACT

A system, method and means is provided for withstanding mechanical shock for use with fluid dynamic bearings. A sealing system is provided that withstands 1000 G shock events. In an aspect, a grooved pumping seal employed between a thrust plate and a shield, a thrust plate having spiral grooves, a fluid recirculation passageway, and a reservoir creates an asymmetric pressure gradient. In an aspect, fluid is retained and air is purged utilizing an enlarged fluid reservoir, axial channels and an angled fill hole. In an aspect, a shaft is attached to a top cover supplying radial stiffness, and an enlarged single-sided thrust plate improves dynamic parallelism.

20 Claims, 7 Drawing Sheets

APPARATUS FOR FLUID RECIRCULATION

CROSS REFERENCE TO RELATED APPLICATIONS

This application is a continuation of U.S. patent application Ser. No. 13/194,796, filed Jul. 29, 2011, which is a continuation of U.S. patent application Ser. No. 12/176,360, filed Jul. 19, 2008, now abandoned, which is a divisional of U.S. patent application Ser. No. 10/632,449, filed Jul. 31, 2003, now U.S. Pat. No. 7,407,327, which claims the benefit of U.S. Provisional Patent Application Ser. No. 60/456,896, filed Mar. 21, 2003.

FIELD

The invention relates generally to spindle motors, and more particularly to a sealing system that withstands mechanical shock events for use with fluid dynamic bearings in disc drive data storage systems.

BACKGROUND

Disc drive memory systems are widely used throughout the world today. These systems are used by computers and devices including digital cameras, digital video recorders, laser printers, photo copiers and personal music players. Disc drive memory systems store digital information that is recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the shaft. One type of motor is known as an in-hub or in-spindle motor, which typically has a spindle mounted by means of a bearing system to a motor shaft disposed in the center of the hub. The bearings permit rotational movement between the shaft and the hub, while maintaining alignment of the spindle to the shaft. The read/write heads must be accurately aligned with the storage tracks on the disc to ensure the proper reading and writing of information.

Spindle motors have in the past used conventional ball bearings between the hub and the shaft. However, the demand for increased storage capacity and smaller disc drives has led to the read/write head being placed increasingly close to the disc surface. The close proximity requires that the disc rotate substantially in a single plane. A slight wobble or run-out in disc rotation can cause the disc to strike the read/write head, possibly damaging the disc drive and resulting in loss of data. Further, resistance to mechanical shock and vibration is poor in the case of ball bearings, because of low damping. Because this rotational accuracy cannot be achieved using ball bearings, disc drives currently utilize a spindle motor having fluid dynamic bearings on the shaft and a thrust plate to support a hub and the disc for rotation. One alternative bearing design is a hydrodynamic bearing.

In a hydrodynamic bearing, a lubricating fluid such as gas or liquid or air provides a bearing surface between a fixed member and a rotating member of the disc drive. Dynamic pressure-generating grooves formed on a surface of the fixed member or the rotating member generate a localized area of high pressure and provide a transport mechanism for fluid or air to more evenly distribute fluid pressure within the bearing and between the rotating surfaces, enabling the spindle to rotate with more accuracy. However, hydrodynamic bearings suffer from disadvantages, including a low stiffness-to-power ratio and increased sensitivity of the bearing to external loads or mechanical shock events.

To increase stiffness, spindle motors have been attached to both the base and the top cover of the disc drive housing. However, in order to use top cover attachment, the motor is open on both ends, which increases the risk of oil leakage. This leakage among other things is caused by differences in net flow rate created by differing pumping grooves in the bearing. If the flow rates within the bearing are not carefully balanced, a net pressure rise toward one or both ends may force fluid out through a seal. Balancing the flow rates is difficult because the flow rates created by the pumping grooves are a function of the gaps defined in the hydrodynamic bearing, and the gaps, in turn, are a function of parts tolerances. Proper sealing is also critical. Bearing fluids give off vaporous components that could diffuse into a disc chamber. This vapor can transport particles such as material abraded from bearings or other components. These particles can deposit on the read/write heads and the surfaces of the discs, causing damage to the discs and the read/write heads as they pass over the discs.

Efforts have been made to address these problems. One design is a top-cover-attach conical bearing having two independent flow paths. This design uses asymmetric sealing and includes a centrifugal seal and a grooved pumping seal. Another existing design, the exclusion seal (x-seal), is used to seal interfacial spaces between the hub and shaft (shown in FIG. 4). The x-seal includes an asymmetric sealing design with a single thrust plate, wherein one end is pumped inward with thrust spiral grooves and the other end with groove pumping seal. At the thrust bearing end, a centrifugal seal maintains oil level change in the capillary reservoir during static to dynamic stage, and non-operating shock. Tests have shown, however, that the centrifugal seal fails at about 500 G shock, and oil leaks through fill holes at about 500 G shock.

Mobile applications require higher non-operating shock than desktop or enterprise products. Laptop computers can be subjected to large magnitudes of mechanical shock as a result of handling. It has become essential in the industry to require disc drives to be able to withstand substantial mechanical shock. A sufficient seating system that can withstand 1000 Gs shock is needed for mobile applications. Further, a need exists to increase shalt stiffness and dynamic parallelism (alignment of the disc surfaces to the plane of the actuator arm motion) white simultaneously lowering bearing power.

SUMMARY

An improved sealing system is provided that withstands operating mode and non-operating mode mechanical shock for use with fluid dynamic bearings, which in turn may be incorporated into a spindle motor or the like. In an embodiment, the seating system withstands at least 1000 G shock. The invention provides an asymmetric sealing method and system and active recirculation within a hydrodynamic bearing to retain fluid and purge air.

Also provided is a system for filling the journal with fluid, which withstands shock. The invention further provides a method for consumption of less power in a spindle motor, and a spindle motor that utilizes smaller size components, yet maintains necessary stability. Also provided is a method for achieving a longer operating for a spindle motor. Further provided is a method and system for supplying radial stiffness within the journal. The invention additionally provides a method and system for increasing dynamic parallelism and shaft to thrust plate bond strength.

Features of the invention are achieved in part, in an embodiment, by utilizing an asymmetric sealing system. An enlarged fluid reservoir, defined between a shield and a sleeve, having a lower pressure area than other fluid containing areas is employed. The invention utilizes a fluid recirculation passageway in fluid communication with the enlarged reservoir to ensure the pressure due to the asymmetry in the journal bearing adjacent to the thrust plate, and inward pumping pressure from the thrust plate are reduced to about atmospheric pressure. A centrifugal capillary seal is employed on an end of the reservoir. When the motor is spinning, centrifugal force acts on the reservoir fluid forcing it into the bearing, and causing air to be expelled. In an embodiment, channels are included adjacent to the reservoir on a shield allowing fluid to be retained rather than leak during a shock event. Due to a pressure difference in the reservoir between a tight gap (non-channel portion) and a larger gap (channel portion), fluid is retained within the reservoir during shock events. The channels further allow air within the fluid to travel along the channel and be expelled from the bearing fluid. An angled fill hole is provided at an end of the reservoir for filling fluid into the bearing and also serving as a location to expel air.

A tapered journal gap further provides asymmetric pressure as well as reduces power consumption at a journal plenum. In an embodiment, a grooved pumping seal (GPS), defined between a shield and an outer diameter of a thrust plate, is provided. The shield is self-aligning (concentric to the hub OD) and acts as a travel limiter to the hub. The asymmetric sealing method and system further incorporates spiral grooves. The spiral grooves are defined on the thrust plate for actively generating pumping pressure to drive fluid recirculation and to pump fluid from the thrust plate bearing toward the shaft, into the journal bearing, and beyond a journal grooving apex, when the shaft and the sleeve are in relative rotational motion. A single-sided thrust plate bearing is utilized. In a further embodiment, grooved pumping is utilized within the journal for providing radial stiffness substantially focused at an apex of the grooving pattern. Further, in an embodiment, an unbalanced and asymmetric grooving pattern at an end of the bearing provides a pressure gradient and establishes a seal.

Dynamic parallelism is improved due to a larger surface contact between the interface of thrush plate OD and the base. A larger thrust plate improves the bond strength at the interface of the thrust plate and shaft.

Reduction of power consumption is achieved, in part, by utilizing smaller size components, including a smaller diameter shaft. Stability of the motor is, however, maintained by attaching the shaft to the top cover. Reduction of power consumption is further achieved, in part, by employing grooved pumping on the thrust plate OD, and utilizing a thinner fluid. A larger reservoir is provided and so a thinner fluid can be utilized, the thinner fluid typically having a higher evaporation rate than thicker fluids. The thinner fluid results in less friction and reduces power consumption by the motor. Further, in an embodiment, a single sided thrust plate is used with magnetic preload to further reduce power losses in the thrust region, bearing losses occurring on only one side of the thrust plate.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A method, system and means of sealing that withstands operating mode and non-operating mode mechanical shock for use with fluid dynamic bearings is described herein. In an embodiment, the sealing system withstands 1000 G shock by way of asymmetric sealing and pressure gradient. As discussed below, in an embodiment, a fluid recirculation passageway, an enlarged fluid reservoir defined between a shield and a sleeve, reservoir channels, grooved pumping, a tapered journal gap and asymmetric journal grooves provide, in part, a system and method of employing an asymmetric pressure gradient. Also as discussed below, in an embodiment, the invention further utilizes the properties of a grooved pumping seal (low volume, high stiffness) and a centrifugal capillary seal (high volume, low stiffness) in the design of the method and system to withstand shock. Further, in an embodiment, an angled fluid fill hole avoids fluid leak during shock and is located at an end of the reservoir.

Figure 1:
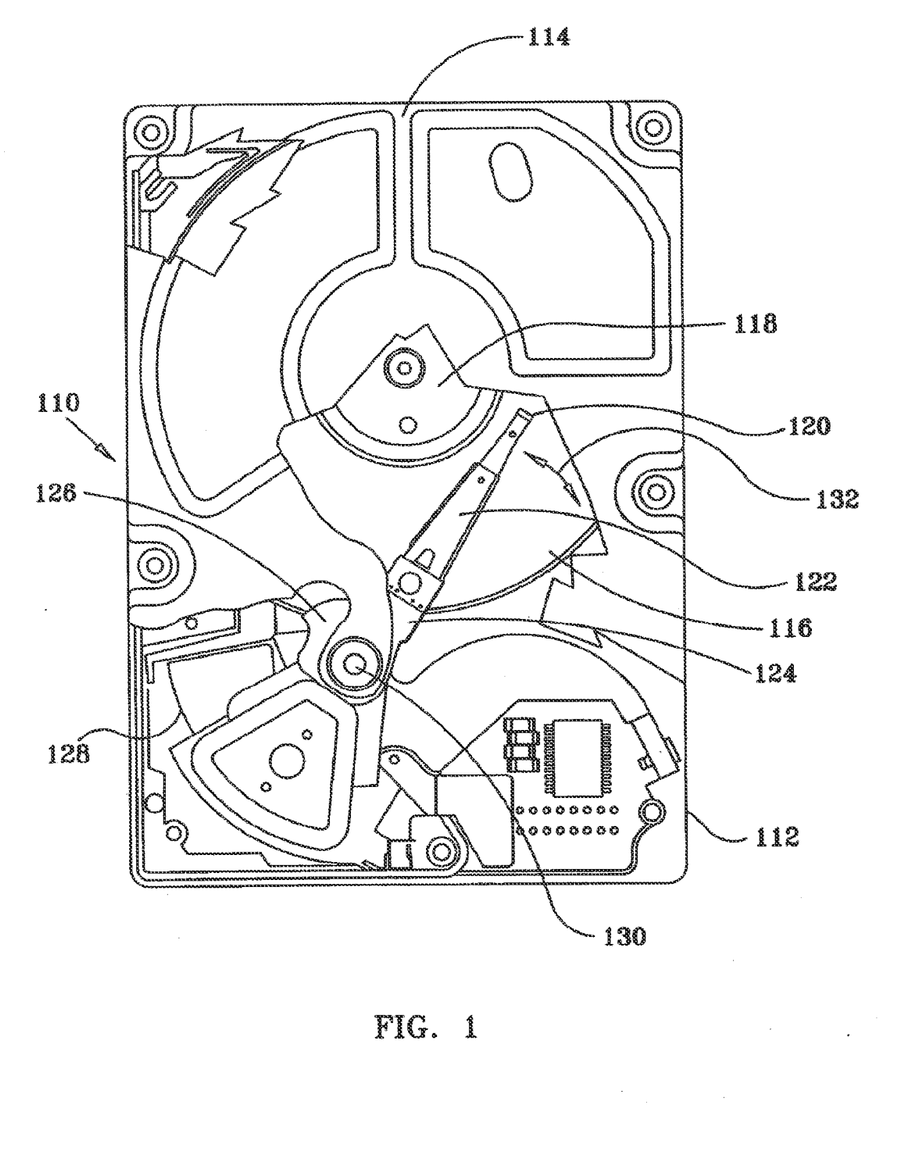
FIG. 1 is a top plan view of a disc drive data storage system in which the present invention is useful.

Referring to the drawings wherein identical reference numerals denote the same elements throughout the various views. FIG. 1 illustrates a typical disc drive data storage device 110 in which the present invention is useful. Clearly, features of the discussion and claims are not limited to this particular design, which is shown only for purposes of the example. It will be readily apparent that the present invention may be applied to disc drives, spindle motors, and other motors having a stationary and a rotatable component. In fact, the designs discussed below can be used in systems where rotation between components exists, even if the components rotate in the same direction.

Disc drive 110 includes housing base 112 that is combined with cover 114 to form a sealed environment. Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

Figure 2:
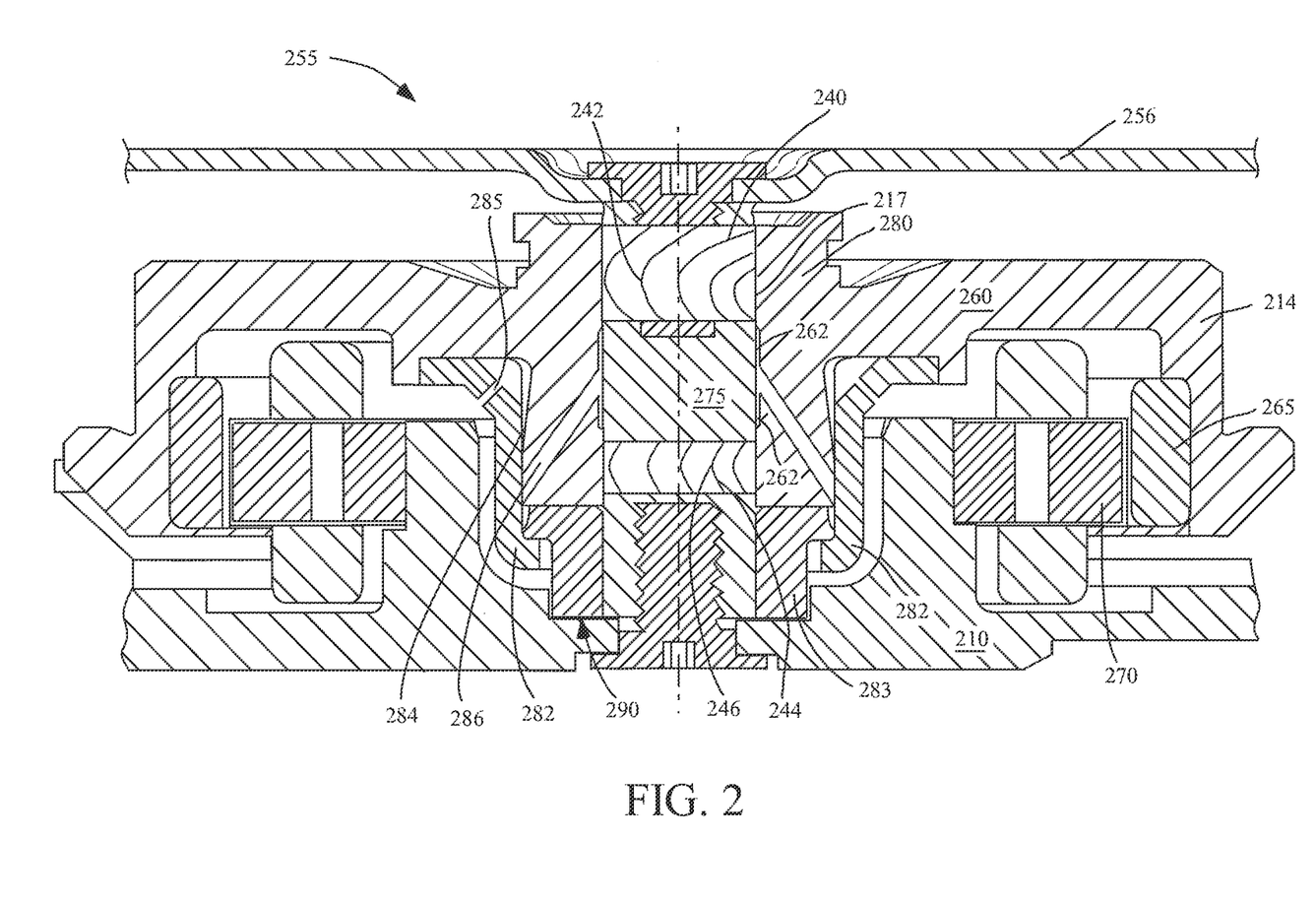
FIG. 2 is a sectional side view of a hydrodynamic bearing spindle motor illustrating features including a fluid recirculation passageway, shield, reservoir and fill hole, in accordance with an embodiment of the present invention.

FIG. 2 is a sectional side view of a hydrodynamic bearing spindle motor 255 used in disc drives 110 in which the present invention is useful. Typically, spindle motor 255 includes a stationary component and a rotatable component. The stationary component includes shaft 275 that is fixed and attached to base 210. It is to be appreciated that spindle motor 255 can employ a fixed shaft as shown in FIG. 2, or a rotating shaft. Further, in an embodiment of the invention, shaft 275 is attached to top cover 256, providing stability to shaft 275 and improving dynamic performance. Thus, in a fixed shaft motor, both upper and lower ends of shaft 275 can be fastened to base 210 and to top cover 256 of the housing, so that the stiffness of the motor and its resistance to shock as well as its alignment to the rest of the system is enhanced.

The rotatable component includes hub 260 having one or more magnets 265 attached to a periphery thereof. The magnets 265 interact with a stator winding 270 attached to the base 210 to cause the hub 260 to rotate. Magnet 265 can be formed as a unitary, annular ring or can be formed of a plurality of individual magnets that are spaced about the periphery of hub 260. Magnet 265 is magnetized to form one or more magnetic poles.

The hub 260 is supported on a shaft 275 having a thrust plate 283 on one end. Thrust plate 283 can be an integral part of the shaft 275, or it can be a separate piece that is attached to the shaft, for example, by a press fit. Further, thrust plate 283 engages with base 210 at interface 290. The invention provides an enlarged contact surface between thrust plate 283 and base 210, namely at interface 290. In an embodiment, interface 290 (the diameter of thrust plate 283 in contact with base 210) is 4.5 mm. It is to be appreciated that the length of interface 290 may vary, and in some cases interface 290 ranges from 3 millimeters to 5 millimeters. This is achieved by an enlarged thrust plate OD contact surface. An improvement in dynamic parallelism results, dynamic parallelism defined as the parallelism between the spinning disk and reference features in base 210 that determine a plane. A three point datum on base 210 is compared with the perpendicularity of the spin axis. The invention provides an enlarged footprint, improving the dynamic parallelism of the components.

Further, due to the longer engagement between thrust plate 283 and shaft 275, bond strength at the interface between thrust plate 283 and shaft 275 is improved. In an embodiment, the engagement between thrust plate 283 and shaft 275 is two times the engagement as compared with conventional motors (i.e., compared to the x-seal).

The shaft 275 and thrust plate 283 fit into sleeve 280 within hub 260. Hub 260 includes a disc carrier member 214, which supports disc pack 116 (shown in FIG. 1) for rotation about shaft 275. Disc pack 116 is held on disc carrier member 214 by disc clamp 118 (also shown in FIG. 1). Hub 260 is interconnected with shaft 275 through hydrodynamic bearing 217 for rotation about shaft 275.

A fluid, such as lubricating oil or a ferromagnetic fluid fills interfacial regions between shaft 275 and sleeve 280, thrust plate 283 and sleeve 280, thrust plate 283 and shield 282, and between shield 282 and sleeve 280. In an embodiment, angled fill hole 285 is positioned to make a 30 degree angle (or an alternative angle, as discussed below) with a surface of shield 282. Although the present figure is described herein with a lubricating fluid, those skilled in the art will appreciate that a lubricating gas can be used.

Typically one of shaft 275 and sleeve 280 includes sections of pressure generating grooves, including asymmetric grooves 240, and symmetric grooves 244. The grooving pattern includes one of a herringbone pattern and a sinusoidal pattern. As shown, asymmetric grooves 240 are placed on one end of the journal and symmetric grooves 244 are placed on an opposite end of the journal. Asymmetric grooves 240 and symmetric grooves 244 induce fluid flow in the interfacial region and generate a localized region of dynamic high pressure and radial stiffness. The pressures are focused at symmetric grooves apex 246 and asymmetric grooves apex 242. As sleeve 280 rotates, pressure is built up in each of its grooved regions. In this way, shaft 275 easily supports hub 260 for constant high speed rotation. In an example, the grooves are separated by raised lands or ribs and have a small depth. In an embodiment, a diamond-like carbon (DLC) coating is utilized on shaft 275 in the region of asymmetric grooves 240 to prevent or minimize particle generation during any contact between shaft 275 and sleeve 280.

In addition to, or as an alternative to the pressure generating grooves as discussed in the previous paragraph, an embodiment of the invention provides fluid flow by other methods (as discussed in detail below). The other methods include a tapered or widened journal area 262, an asymmetric pressure gradient, a low pressure area within reservoir 284 defined between shield 282 and sleeve 280, a sleeve passageway 286, a grooved pumping seal between shield 282 and thrust plate 283, and spiral grooves on thrust plate 283.

In an embodiment of the invention, sleeve passageway 286 is situated at a point between asymmetric grooves 240, and symmetric grooves 244. Sleeve passageway 286 is generally positioned at a midpoint along shaft 275 providing a low pressure area. A low pressure area in the center of the motor is acceptable since a bearing in the center of the motor offers little radial stiffness. Further, positioning sleeve passageway 286 in an angled manner enables a one-piece hub to be machined.

The invention further provides a shield 282 that radially self-aligns into sleeve 280. A light radial interference fit (light press fit) is employed between shield 282 and sleeve 280 for self alignment. On one end (adjacent to thrust plate 283) sleeve 280 locates shield 282 radially, and on another end shield 282 is attached to hub 260 (i.e., laser welded). The invention therefore provides, in an embodiment, a constant gap of about 20 to 30 microns between thrust plate 283 and shield 282.

Since thrust plate 283 is single-sided, hub 260 has freedom of movement in an axial direction. Shield 282 is therefore provided by the invention as a travel limiter to hub 260, defining a radial displacement limit to hub 260. Shield 282 also serves as a damper to hub 260 to dissipate energy caused by mechanical shock.

Figure 3:
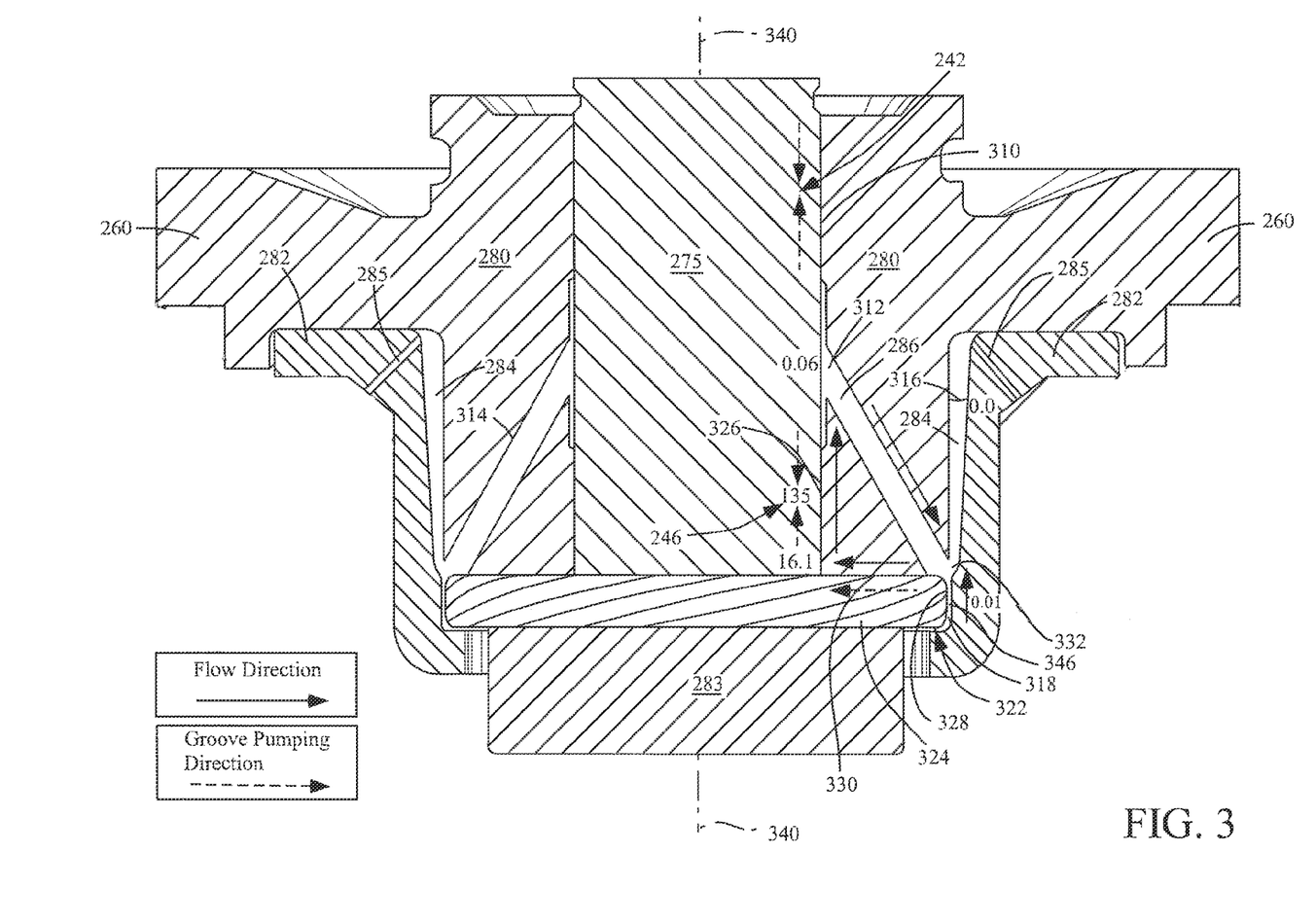
FIG. 3 is another sectional side view of a hydrodynamic bearing spindle motor as in FIG. 2, with FIG. 3 having a shallower cross section as compared to FIG. 2, and the symmetric and asymmetric grooves of FIG. 2 shown instead by arrows, in order to show in FIG. 3 a more detailed view of features including a fluid recirculation passageway, shield, reservoir, fill hole, thrust plate pumping grooves, example pressures, fluid flow direction and pumping direction, and FIG. 3 not illustrating particular features sufficiently shown in FIG. 2 including atop cover, stator winding, magnets, and baseplate, in accordance with an embodiment of the present invention.

FIG. 3 presents a fluid dynamic bearing system illustrating, in an embodiment of the invention, fluid pumping direction, fluid direction and example pressures. In an embodiment, an inverted shield is utilized. Shield 282 is described as inverted since capillary seal 316 is inverted as compared to an x-shield design (x-shield shown in FIG. 4). An asymmetric pressure gradient is created by the invention. The asymmetric pressure is created by features including a fluid recirculation passageway, an enlarged fluid reservoir defined between a shield and a sleeve, reservoir channels, grooved pumping, a tapered journal gap and asymmetric journal grooves.

In an embodiment, the fluid capacity of reservoir 284 is 2.5 mg. It is to be appreciated that this capacity is not fixed. The enlarged fluid reservoir 284 having channels 510 contribute to the asymmetric pressure gradient (channels 510 shown in FIG. 5). Due to a lower flow resistance and lower pressure in enlarged reservoir 284, compared with other fluid containing areas, fluid is received and retained within reservoir 284 during non-operating or operating shock events. As an example, numerical example pressures are illustrated in FIG. 3. As shown, reservoir 284 shows a pressure of 0.0 psi while the journal shows pressures of 0.06 psi to 135 psi. When the motor is spinning and forcing fluid by centrifugal force from reservoir 284, pumping grooves 324 generate pumping pressure and drive fluid recirculation through the motor. However, when the motor is not spinning and centrifugal force subsides, or during shock events, reservoir 284 can receive fluid from areas including the outer diameter gap 346 of thrust plate 283 and from the journal between shaft 275 and sleeve 280.

Grooved pumping is employed along the inside diameter (ID) and the outside diameter (OD) of thrust plate 330. Pumping grooves are formed on thrust plate 283 for active recirculation. In the case of the ID, spiral pumping grooves 324 generate sufficient pumping pressure to drive fluid recirculation and to pump fluid from thrust plate bearing passageway (adjacent to the thrust plate ID) toward shaft 275, into the journal bearing, and beyond lower journal symmetric grooving apex 246, when shaft 275 and sleeve 280 are in relative rotational motion. Asymmetric grooves 242 and symmetric grooves 244 also create pressure within the journal and force fluid movement to a groove apex (as described above in FIG. 2). In an embodiment, when the motor is spinning, the fluid flow direction is inward from the bearing of the thrust plate ID 330, along the journal bearing to journal plenum 312, through sleeve passageway 286, to recirculation plenum 332 and then returning to the bearing of the thrust plate ID 330. The fluid flow direction, in an example, is illustrated by solid lines shown in FIG. 3. It is to be appreciated that in other embodiments, the fluid flow direction may take on another direction. The grooved pumping direction, in an example, is illustrated by dashed lines shown in FIG. 3. In another embodiment of the invention, thrust plate 283 is structured without pumping grooves 324.

Figure 5:
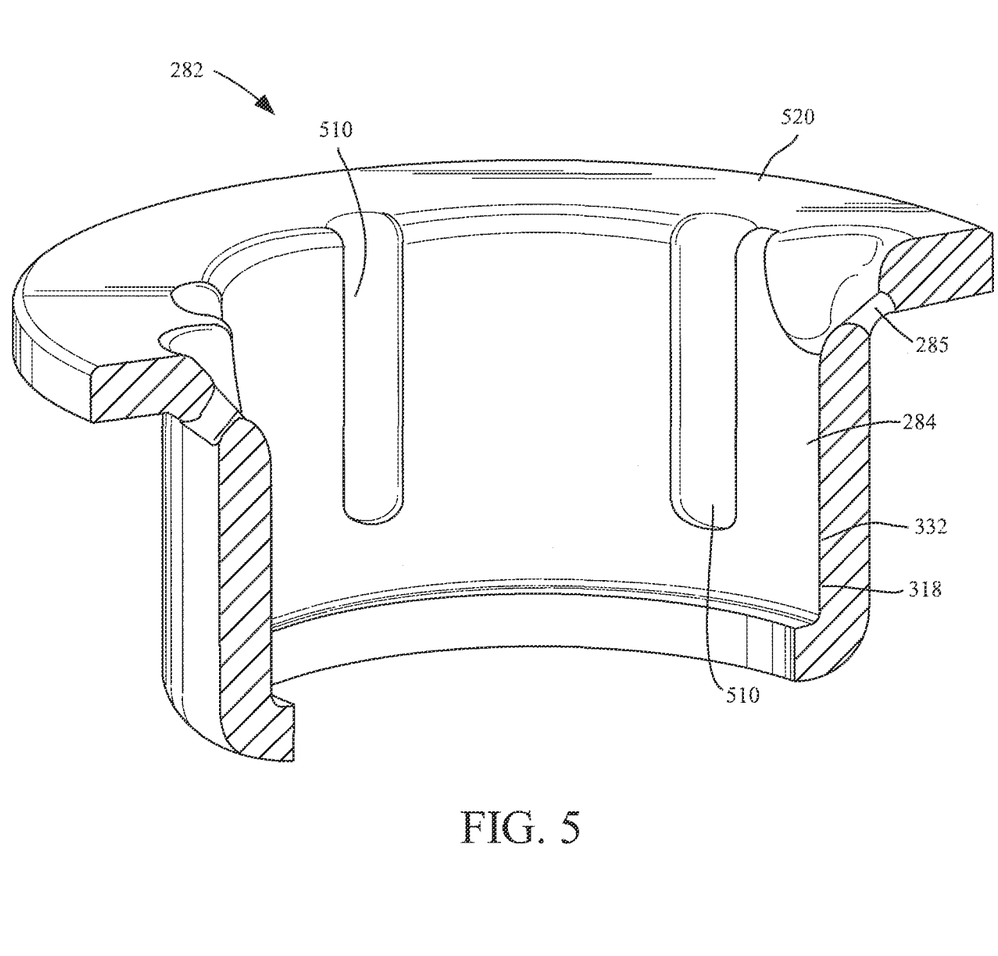
FIG. 5 is a perspective view of a shield sectioned to illustrate channels and an angled fill hole, in accordance with an embodiment of the present invention.

A fluid recirculation passageway includes sleeve passageway 286 and a bearing between thrust plate ID 330 and sleeve 280. Sleeve passageway 286 is positioned such that one end is placed generally at a midpoint along shaft 275 and a second end joins recirculation plenum 332 such that, in one situation, fluid and air may travel along channels 510 (FIG. 5). Recirculation plenum 332 is defined by a junction joining reservoir 284, sleeve passageway 286, thrust plate 330 and thrust plate outer diameter gap 346. Sleeve passageway 286 provides a low pressure area compared to the journal bearing. A low pressure area in the center of the motor is feasible for the reason that a bearing in the center of the motor offers little radial stiffness. The tower pressure area also advantageously reduces power consumption by journal plenum 312. In an example, as shown in FIG. 3, 0.06 psi occurs at journal plenum 312, while a higher pressure occurs on either side of journal plenum 312. A wider or variable journal gap also is provided adjacent to journal plenum 312 for creating a lower pressure area. The wider or variable journal gap, adjacent to journal plenum 312, diverges toward journal plenum 312.

A recirculation passageway ensures the pressure due to the asymmetry in lower journal bearing 326 adjacent to the thrust plate, and inward pumping pressure from pumping grooves 324 of thrust plate 283 are reduced to about atmospheric pressure. The flow resistance of sleeve passageway 286 is significantly lower than the flow resistance of the upper journal 310 and lower journal 326, so a pressure drop occurs across the journal bearing.

The fluid recirculation passageway is biased for creating an asymmetric pressure gradient and substantially circulating fluid from the journal to sleeve passageway 286 and then to the bearing of thrust plate ID 330, and then returning to the journal. Capillary attraction fills the journal area, and recirculation of the fluid purges any air within the journal.

In an embodiment, the invention utilizes and makes use of the properties of a grooved pumping seal (low volume, high stiffness) and a centrifugal capillary seal (high volume, low stiffness) to withstand mechanical shock.

FIG. 3, a grooved pumping seal (UPS) 318 is employed in outer diameter gap 346 defined between shield 282 and an OD of thrust plate 283. By way of pumping grooves 324, GPS 318 establishes an outer diameter gap sealing stiffness and generates pressure substantially equivalent to the pressure located at recirculation plenum 332, when shaft 275 and sleeve 280 are in relative rotational motion. UPS 318 is a high stiffness seal and, in an embodiment, the invention makes use of this characteristic by utilizing UPS 318 with an end of outer diameter gap 346. UPS 318 pumps fluid from outer diameter gap 346 serving to prevent fluid leakage from fluid boundary 322. UPS 318 is a low volume seal and the invention makes use of this characteristic. Pumping fluid from outer diameter gap 346 serves to reduce power consumption by establishing air in outer diameter gap 346, thereby reducing friction since air is present between the OD of thrust plate 283 and shield 282.

A centrifugal capillary seal (CCS) 316 is defined between shield 282 and sleeve 280. In an embodiment, the adjacent surfaces of shield 282 and sleeve 280 have relatively tapered surfaces that converge toward recirculation plenum 332. A meniscus is formed between the tapered surfaces, and fluid within reservoir 284 is forced toward recirculation plenum 332 by centrifugal force when shaft 275 and sleeve 280 are in relative rotational motion. CCS 316 is a low stiffness seat and, in an embodiment, the invention makes use of this characteristic by attaching shield 282 to hub 260 by welding or other means making a fluid barrier above the fluid meniscus. CCS 316 is a high volume seal and the invention makes use of this characteristic by CCS 316 with an enlarged reservoir 284.

Asymmetric seating is also employed at upper journal 310. Asymmetric grooves 242 generate pressure within upper journal 310 substantially equivalent to the pressure located at journal plenum 312. Fluid is forced from upper journal 310 generally to groove apex 242 (as described above in FIG. 2).

Figure 4:
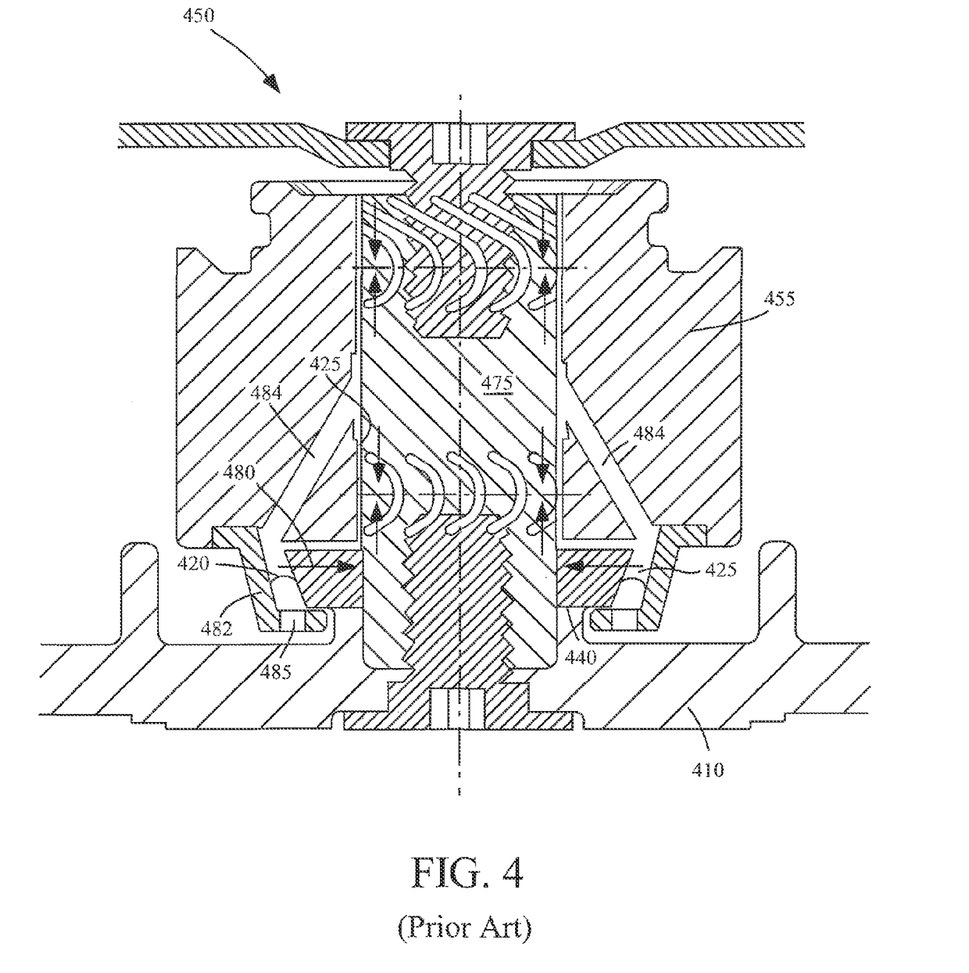
FIG. 4 is a sectional side view of a known spindle motor design.

FIG. 4 illustrates an example of a fluid dynamic bearing utilizing a conventional X-seal. Motor 450 includes shaft 475, sleeve 455, path 484, thrust plate 480, shield 482, fill hole 485 and capillary seal 420. As can be observed, gap 425 maintains fluid (about 0.5 mg of fluid) in part by way of capillary seal 420. Further, fill hole is positioned below capillary seal 420. In an embodiment, the present invention utilizes an enlarged reservoir 284, channels 510, a grooved pumping seal 318 and an angled fill hole 285, thereby withstanding greater shock than the X-seal design, using less power and providing a longer life for the motor. Further, the present invention provides interface 290, which, in an embodiment, is a larger surface area than interface 440 of the X-seal design, effecting greater dynamic parallelism and shaft to thrust plate bond strength.

Referring to FIG. 5, in an embodiment, reservoir 284 includes channels 510. Channels 510 run in a generally axial direction along the walls of shield 282. Channels 510 extend from recirculation plenum 332 and along reservoir 284. In some cases, channels 510 are in-line with sleeve passageway 286. In one embodiment, six channels are employed, and in another embodiment, two wider channels are employed. It is to be appreciated that the number, length, width and positioning of channels 510 may vary and is determined by bearing requirements.

Channels 510 allow air within the fluid to travel along channels 510 and be purged from the fluid. Channels 510 further provide a means for fluid to be retained within reservoir 284. Fluid is retained within reservoir 284 during shock events due to a pressure difference between a portion of reservoir 284 having channels and a portion of reservoir 284 without channels. In another embodiment of the invention, reservoir 284 serves as a low pressure area without having channels 510.

Figure 6:
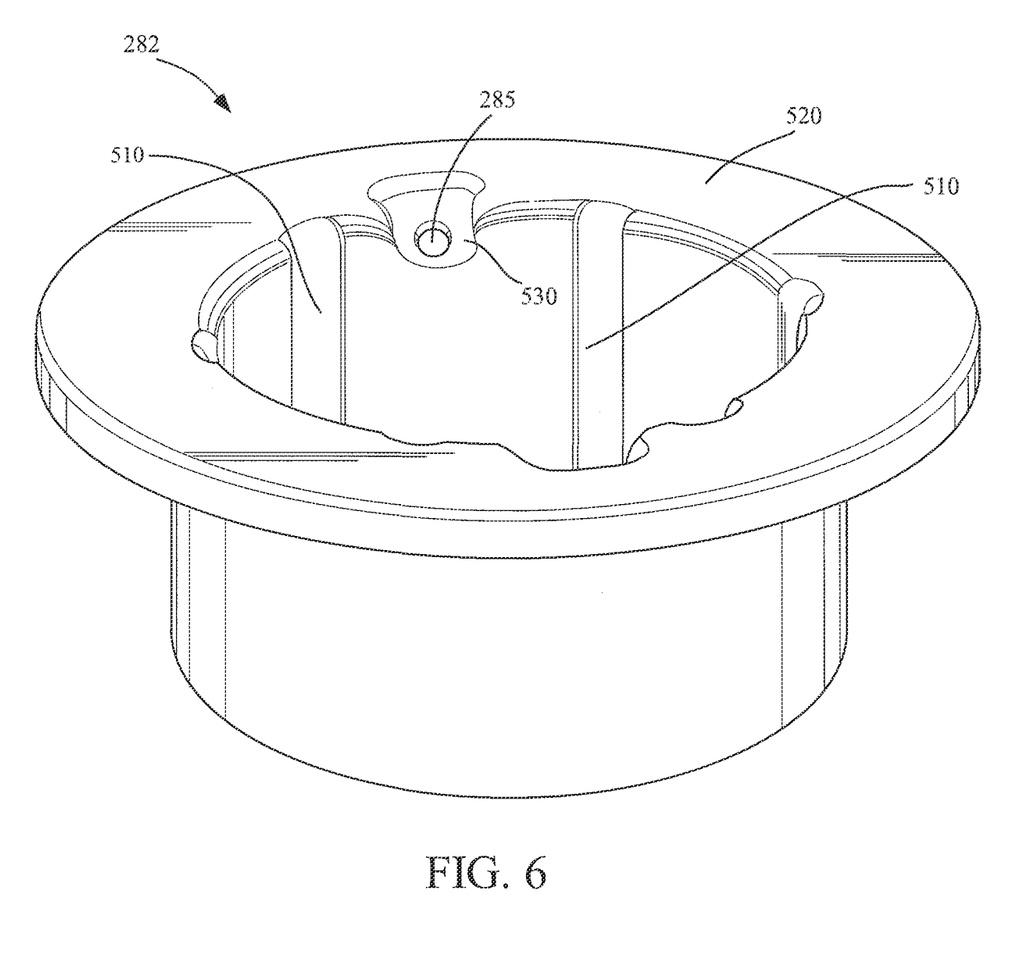
FIG. 6 is another perspective view of a shield illustrating channels and an angled fill hole, in accordance with an embodiment of the present invention.

FIG. 6 illustrates an embodiment of the invention that includes angled fill hole 285. Angled fill hole 285 (or air vent hole) provides a means to fill a fluid dynamic bearing with fluid. A predetermined amount of fluid is injected into angled fill hole 285 above capillary seal 316. Angled fill hole 285 is positioned to make a 30 degree angle or an alternative angle (i.e., 45 degrees) with a surface of shield 282. It is to be appreciated that angles beside 30 degree can be used. Further, in an embodiment, two angled fill holes are employed. It is to be appreciated that other numbers of angled fill holes can be utilized. Also shown in FIG. 6 is attachment location 520 wherein shield 282 is attached to sleeve 280, in an embodiment of the invention. Fill hole 285 is positioned adjacent to a sealed wall at attachment location 520. In an embodiment, fill hole 285 is positioned between channels 510. In another embodiment of the invention, the fill hole is positioned without making an angle with a surface of shield 282 and positioned on another section of shield 282.

During a shock event, fluid may travel along channels 510 and collide with sleeve 280, decelerating the traveling fluid. Frictional drag slows the fluid within reservoir 284 and along channels 510, due to the viscosity of the fluid. The motion of the fluid is therefore retarded such that fluid may reach and collect at pool area 530 without leaking from fill hole 285. In some cases, pool area 530 fills with fluid slower than the duration of a shock event. Further, angled fill hole 285 opposes escape of fluid during shock since the fluid follows a path of least resistance and an angled hole presents greater resistance in comparison to capillary force gradients.

Figure 7:
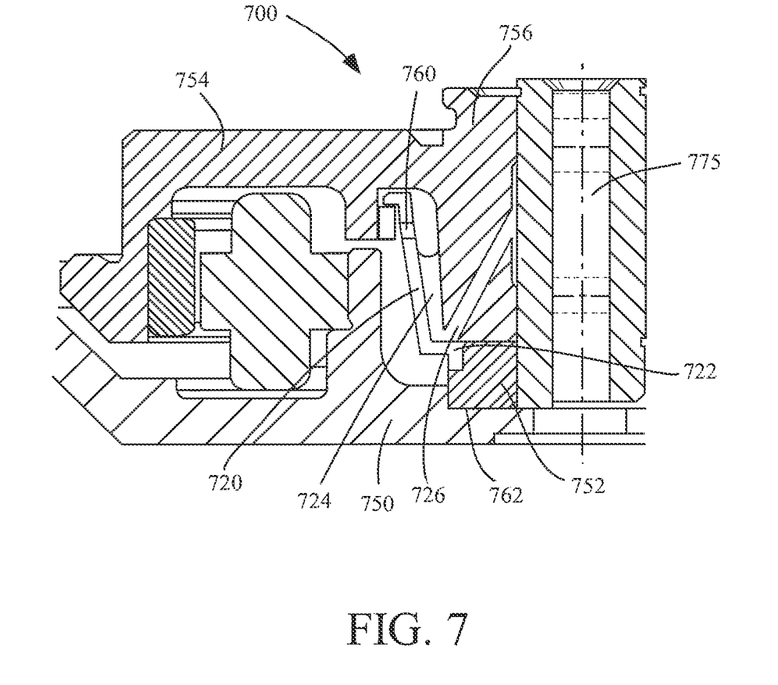
FIG. 7 is a sectional side view of a portion of a hydrodynamic bearing spindle motor illustrating features including a fluid recirculation passageway, a shield attached to a thrust plate, a reservoir and a fill hole, in accordance with another embodiment of the present invention.

Referring to FIG. 7, a further embodiment of the invention is illustrated. Similar to previously described embodiments, an inverted shield is employed with spindle motor 700. Also similar to previously described embodiments, enlarged reservoir 724 and sleeve passageway 726 contribute to the asymmetric pressure gradient (as described above) for withstanding shock events. Thrust plate 752 establishes an enlarged interface 762 with base 750.

In this embodiment of the invention, however, shield 720 is attached to thrust plate 752 at shield attachment 722 and hub 754 rotates relative to shield 720. A DLC coating is utilized on one of the relatively rotating adjacent surfaces, namely sleeve 756 and shield 720 to prevent or minimize particle generation during any contact. Further, in this embodiment, fill hole 760 is positioned without making an angle with a surface of shield 282.

The following specific example is provided for illustrative purposes and is not intended to be limiting. Results from experiments conducted showed, in an embodiment, the present invention utilized within a spindle motor satisfactorily withstands 1000 G shock. The shock was directed over six axes with pulse duration of two milliseconds, half sine wave. In further testing, multiple shocks having the same testing conditions were directed onto a spindle motor incorporating an embodiment of the invention and the spindle motor withstood the shock events.

Having disclosed exemplary embodiments, modifications and variations may be made to the disclosed embodiments while remaining within the spirit and scope of the invention as defined by the appended claims. For example, although the present invention has been described with reference to a sealing system for a disc drive storage system and a spindle motor assembly, those skilled in the art will recognize that features of the discussion and claims may be practiced with other systems having a stationary and a rotatable component. The components may even rotate in the same direction. Further, the present invention is useful in many additional systems requiring shock tolerance.

We claim:

1. An apparatus, comprising:
 a journal bearing comprising a shaft and a sleeve positioned for relative rotation;
 a thrust plate extending radially from the shaft; and
 a fluid recirculation system comprising
   a sleeve passageway joining the journal bearing at a journal plenum,
   a thrust plate bearing passageway between the sleeve and the thrust plate,
   a pump seal between the thrust plate and a shield,
   a reservoir comprising a fluid seal, the reservoir between the sleeve and the shield, and
   a recirculation plenum comprising a junction of the sleeve passageway, the thrust plate bearing passageway, and the reservoir,
 wherein the sleeve passageway and the thrust plate bearing passageway are in fluid communication with the journal bearing at different locations.

2. The apparatus of claim 1, further comprising: spiral grooves on the thrust plate.

3. The apparatus of claim 1, further comprising:
 an outer diameter gap comprising the pump seal, the outer diameter gap being in between the shield and an outer diameter of the thrust plate, joining the sleeve passageway, the thrust plate bearing passageway, and the reservoir at the recirculation plenum; and
 wherein the pump seal is a grooved pumping seal.

4. The apparatus of claim 1, wherein the fluid seal comprises a centrifugal capillary seal, and wherein the shield and the sleeve have relatively tapered surfaces converging toward the recirculation plenum.

5. The apparatus of claim 1, wherein the reservoir is structured to hold up to 2.5 mg of fluid.

6. The apparatus of claim 1, further comprising:
axial channels on at least a portion of an inner surface of the shield substantially extending from the recirculation plenum.

7. The apparatus of claim 1, further comprising:
a meniscus positioned between a fluid fill-hole within the shield and fluid in the reservoir.

8. The apparatus of claim 1, wherein the shaft is affixed to a base and to a top cover plate, and wherein the sleeve rotates relative to the shaft.

9. The apparatus of claim 1, wherein an engagement interface of the thrust plate with a base ranges from 3 millimeters to 5 millimeters.

10. The apparatus of claim 1, wherein the shield is operable to provide a travel limiter to a hub.

11. The apparatus of claim 1, further comprising:
a symmetrical grooving pattern on a portion of the sleeve adjacent to the shaft, comprising one of a herringbone pattern or a sinusoidal pattern.

12. The apparatus of claim 1, further comprising:
an asymmetrical grooving pattern on a portion of the shaft, wherein the journal plenum is positioned between the asymmetrical grooving pattern and the thrust plate.

13. The apparatus of claim 1, further comprising:
a variable journal gap comprising a larger gap substantially adjacent to the journal plenum.

14. The apparatus of claim 1, further comprising:
a diamond-like carbon (DLC) coating on an end of the shaft, wherein the journal plenum is positioned between the DLC coating end of the shaft and the thrust plate, and a sleeve adjacent to a relatively rotating shield.

15. An apparatus, comprising:
a journal bearing comprising a shaft and a sleeve positioned for relative rotation;
a thrust plate extending radially from the shaft; and
a fluid recirculation system comprising
  a sleeve passageway joining the journal bearing at a journal plenum,
  a thrust plate bearing passageway between the sleeve and the thrust plate,
  a pump seal between the thrust plate and a shield, and
  a reservoir comprising a fluid seal, the reservoir between the sleeve and the shield, and
  a recirculation plenum comprising a junction of the sleeve passageway, the thrust plate bearing passageway, the reservoir, and an outer diameter gap between the shield and an outer diameter of the thrust plate,
wherein the sleeve passageway and the thrust plate bearing passageway are in fluid communication with the journal bearing at different locations.

16. The apparatus of claim 15, wherein the shield and the sleeve have relatively tapered surfaces converging toward the recirculation plenum.

17. The apparatus of claim 15, wherein the fluid seal comprises a meniscus positioned between a fluid fill-hole within the shield and fluid in the reservoir.

18. An apparatus, comprising:
a journal bearing comprising a shaft and a sleeve positioned for relative rotation;
a thrust plate extending radially from the shaft; and
a fluid recirculation system comprising
  a sleeve passageway joining a variable journal gap at a journal plenum,
  a thrust plate bearing passageway between the sleeve and the thrust plate,
  a pump seal between the thrust plate and a shield,
  a reservoir comprising a fluid seal, the reservoir between the sleeve and the shield, and
  a recirculation plenum comprising a junction of the sleeve passageway, the thrust plate bearing passageway, the pump seal and the reservoir,
wherein the sleeve passageway and the thrust plate bearing passageway are in fluid communication with the journal bearing at different locations.

19. The apparatus of claim 18, wherein the fluid recirculation system further comprises a junction along the journal bearing connecting the variable gap and the thrust plate bearing passageway.

20. The apparatus of claim 18, further comprising:
asymmetric grooves on a upper portion of the journal bearing operable to generate pressure within the upper portion of the journal bearing substantially equivalent to pressure at the journal plenum, wherein the upper portion is a portion of the journal bearing between the journal plenum and a top cover.

* * * * *